(12) United States Patent
Makofsky et al.

(10) Patent No.: US 12,314,348 B2
(45) Date of Patent: May 27, 2025

(54) METHOD AND SYSTEM FOR USER CONTENT VIEW PROTECTION

(71) Applicant: Disney Enterprises, Inc., Burbank, CA (US)

(72) Inventors: Steven Makofsky, Sammamish, WA (US); Nitzan Katz, Los Altos, CA (US); Michael David Smith, Seattle, WA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1018 days.

(21) Appl. No.: 14/149,617

(22) Filed: Jan. 7, 2014

(65) Prior Publication Data

US 2015/0193626 A1 Jul. 9, 2015

(51) Int. Cl.
*G06F 21/10* (2013.01)

(52) U.S. Cl.
CPC .................... *G06F 21/10* (2013.01)

(58) Field of Classification Search
None
See application file for complete search history.

(56) References Cited

U.S. PATENT DOCUMENTS

| | | | |
|---|---|---|---|
| 5,343,526 A * | 8/1994 | Lassers | G06F 21/105 705/59 |
| 5,892,900 A * | 4/1999 | Ginter et al. | |
| 7,730,216 B1 * | 6/2010 | Issa | H04L 67/104 709/214 |
| 2002/0129001 A1 * | 9/2002 | Levkoff | G06F 17/5004 |
| 2005/0226166 A1 * | 10/2005 | Agrawal | H04L 67/2828 370/252 |
| 2005/0251675 A1 * | 11/2005 | Marcjan et al. | |
| 2005/0285716 A1 * | 12/2005 | Denison | G06F 21/6209 340/5.2 |
| 2006/0161966 A1 * | 7/2006 | Nagampalli | G06F 21/6218 726/1 |
| 2007/0296805 A1 * | 12/2007 | Tedenvall | H04N 7/17318 348/14.01 |
| 2008/0250480 A1 * | 10/2008 | Meshkat | H04L 9/3226 726/6 |
| 2009/0037517 A1 * | 2/2009 | Frei | G06F 17/30893 709/202 |
| 2009/0043691 A1 * | 2/2009 | Kasower | G06Q 20/10 705/39 |
| 2009/0125319 A1 * | 5/2009 | Craine | G06Q 10/10 705/1.1 |

(Continued)

OTHER PUBLICATIONS

Della Quercia "7 Memes That Went Viral Before The Internet Existed", Cracked.com, (Year: 2011).*

*Primary Examiner* — Neha Patel
*Assistant Examiner* — Yin Y Choi
(74) *Attorney, Agent, or Firm* — Dorsey & Whitney LLP (57) ABSTRACT

A user content protection system and method that may include a content-sharing application associated with a user device and/or an access monitor configured to monitor access limitations placed on content shared by the content sharing application. The content-sharing application may be configured to share content from the user device to one or more other user devices. The access monitor may provide conditional access to the content depending on whether or not certain access limitations have been exceeded.

11 Claims, 7 Drawing Sheets

(56) References Cited

U.S. PATENT DOCUMENTS

| | | | |
|---|---|---|---|
| 2009/0150618 A1* | 6/2009 | Allen, Jr. | G06F 12/0862 |
| | | | 711/137 |
| 2009/0234876 A1* | 9/2009 | Schigel | G06F 17/30873 |
| 2010/0192210 A1* | 7/2010 | Purdy et al. | |
| 2010/0281159 A1* | 11/2010 | Boscolo | H04L 63/20 |
| | | | 709/224 |
| 2011/0039594 A1* | 2/2011 | Liu | H04W 48/02 |
| | | | 455/515 |
| 2011/0060823 A1* | 3/2011 | Phillippe | G06F 11/321 |
| | | | 709/224 |
| 2011/0093561 A1* | 4/2011 | Courtay | H04L 67/104 |
| | | | 709/217 |
| 2011/0191862 A1* | 8/2011 | Mandava et al. | |
| 2011/0208830 A1* | 8/2011 | Haruna | G06F 17/30861 |
| | | | 709/217 |
| 2011/0231778 A1* | 9/2011 | Hoag | G06F 17/30867 |
| | | | 715/745 |
| 2011/0239273 A1* | 9/2011 | Yang | G06F 21/577 |
| | | | 726/3 |
| 2012/0096148 A1* | 4/2012 | Manjunath | H04L 29/08675 |
| | | | 709/224 |
| 2012/0106574 A1* | 5/2012 | Sylvain | H04L 12/1818 |
| | | | 370/474 |
| 2012/0148215 A1* | 6/2012 | Kennedy | H04N 5/76 |
| | | | 386/278 |
| 2012/0289239 A1* | 11/2012 | Luna et al. | |
| 2012/0331108 A1* | 12/2012 | Ferdowsi et al. | |
| 2014/0074991 A1* | 3/2014 | Gibson et al. | |
| 2014/0280758 A1* | 9/2014 | Sharma et al. | |
| 2014/0289868 A1* | 9/2014 | Byrne et al. | |
| 2015/0135337 A1* | 5/2015 | Fushman | G06F 16/9558 |
| | | | 726/30 |

* cited by examiner

METHOD AND SYSTEM FOR USER CONTENT VIEW PROTECTION

TECHNICAL FIELD

Aspects of the present disclosure relate to conditional access content protection systems and methods.

BACKGROUND

Videos, sound recordings, or other media content that are shared over computer networks such as the Internet have the potential of "going viral." In the case of a "viral video," the video content can become extremely popular over a short period of time through sharing of a link to the video among a number of computer users. In some cases, the content can reach certain users to whom an originator or owner of the content does not wish access to be granted. Additionally, increased demand for the content can create high volumes of network traffic and threaten to overwhelm the servers on which the content is stored. Thus, there is a need to place certain limits on access to videos, sound recordings, or other media that can be accessed by potentially large numbers of people.

SUMMARY

The present disclosure is generally directed to a user content protection system and method that may include a content-sharing application associated with a user device and/or an access monitor configured to monitor access limitations placed on content shared by the content sharing application. The content-sharing application is configured to share content from the user device to one or more other user devices. The content-sharing application may be provided in association with a server or other computing device or component, which facilitates sharing of content by storing or otherwise providing the content as an accessible resource. The content-sharing application shares the content by transmitting a shareable link associated with the resource to the one or more other user devices. An access monitor provides conditional access to the resource depending on whether or not certain access limitations have been exceeded. In one respect, the access monitor may grant or deny access depending on whether or not certain numerical access limits have been reached. In another respect, the access monitor may grant or deny access depending on whether or not certain geographic access limits have been reached.

One implementation of the present disclosure may take the form of a content-sharing method, comprising monitoring an access limit on content; providing access to the content if the limit is not exceeded; and denying access to the content if the limit is exceed; wherein the access limit is modifiable.

Another implementation may take the form of a content-sharing method, comprising setting an access limit on a content; and modifying the limit in response to received requests for access to the content; wherein the limit on the content is monitored and access to the content is denied if a particular received request exceeds the limit on the content.

Yet another implementation may take the form of a content-sharing platform, comprising an application configured to execute on a user device to publish content and an electronically shareable link to the user-generated content; a resource server configured to receive the content from the application and to store the content such that the content may be accessed via the electronically shareable link; and an access monitor configured to deny a request for access to the content read source generated by the shareable link in the event that the request exceeds a limit on access to the content.

DETAILED DESCRIPTION

The present disclosure is generally directed to a content protection system and method that protects content from being accessed beyond certain specified limits. The content may be a video, a sound recording, images, and/or other media content that can be accessed over a network. In certain embodiments, the content is made accessible by a user sharing the content among a number of users. For example, a user may take a video with a smart phone camera and then make that video available for other users to access. Here, the user may post the video to a website or upload the video to his or her page on a social networking platform. Other methods of sharing a video or other content are described in greater detail herein and can include email, text message, or, more generally, electronically transmitting a Uniform Resource Identifier (URI). Once the user initially makes the content available for other user to access, those users that are aware of the content can then share the content with additional users. For example, a user with whom the content was initially shared may text, email, or otherwise electronically transmit a URI and in so doing share the content with one or more additional users. This process may repeat again and again such that the number of users that access or have access to the content grows larger and larger.

In certain instances, it may be desirable to protect content or otherwise limit access to content in the event that the content can be shared and thus become accessible by larger and larger numbers of users. For example, a user or a user's parent or guardian may want shared content to be available only to a certain pre-determined group of people. Here, a parent may want to allow a child to participate in electronic sharing of content, but at the same time want to protect that child's privacy. By way of further example, a system administrator may want shared content to be available only to a limited group of people in order to protect servers or other computing devices from being overloaded due to increased traffic. Additionally, retailers, merchants, or other providers of goods and services may want certain sharable advertisements or promotions to be available only in certain areas. Here, a storefront business may make available an electronically shareable promotion, but want the promotion to be accessible only by devices that are located within a certain distance from the store.

Systems and methods discussed herein provide protection for sharable content through enabling, monitoring and enforcing access limitations on the sharable content. In certain embodiments, the access limitations placed on sharable content may be numerical. Here, access limitations may be monitored and access to the content granted so long as the number of users having access to the content is less than a certain specified maximum amount. This type of access limitation may be utilized by, for example, a parent or guardian seeking to protect a child's privacy. By specifying a certain maximum number of viewers, the parent or guardian can ensure that a child's shareable content is only seen by a small or otherwise limited group of people. In other embodiments, the access limitations placed on sharable content may be geographical. Here, access limitations may be monitored and access to content granted so long as the user making the access request is within a set geographical boundary. This type of access limitation may be utilized by, for example, a provider or goods that wants its electronically sharable promotions to be accessible only from certain locations.

In accordance with certain embodiments, the access limitations placed on sharable content may be modifiable. In one respect, access limitations may be modifiable by an originator or an owner of the content. The originator or owner of the content may decide to raise or lower certain access limitations based on access patterns that occur once the content becomes accessible by others. In this regard, certain embodiments may provide identifying information regarding the users that are accessing the content so as to enable the originator or owner of the content to decide whether or not the access limitations should be modified. For example, a parent or guardian may place a low numerical limit on the number of viewers that are allowed to access a child's content, and then raise the limit somewhat once he or she is comfortable with the access requests that are received. In another respect, access limitations may be modifiable by a network administrator or other information systems personal that maintains a server or other computing device that contains the network resource that provides the content. In this example, the access limitations may be in place to protect the server or other computing device from overloads due to high traffic volumes. In still other respects, the access limitations may be modifiable by a combination of a network administrator and the originator of the content. For example, a network administrator may monitor requests for access to the content and notify the originator or owner in the event that the limits have been exceeded. In the event that the owner or originator of the content authorizes an increase, the network administrator may increase the access limitation.

Embodiments discussed herein may be implemented in any network architecture that supports content sharing. Generally, embodiments may be implemented in the context of any network architecture that allows a user to post content and to transmit a shareable link or other connection mechanism to one or more other users. For example, certain embodiments may be implemented in a client-server environment where the content is up-loaded to a server and the link includes an address to a server resource that provides access to the content. Certain embodiments may also be implemented in a peer-to-peer networking environment. It should be appreciated that the shared content may be stored and accessed from various locations depending on the implementation. In some instances, the content is stored and accessed from a computing device, such as a server, that is separate and remote from the device operated by the user. In other instances, the content is stored and accessed from the user's device. Present embodiments will now be discussed with the particular networking environment shown in FIG. 1. By way of example and not limitation, FIG. 1 shows embodiments illustrated generally in a client-server networking environment.

Figure 1:
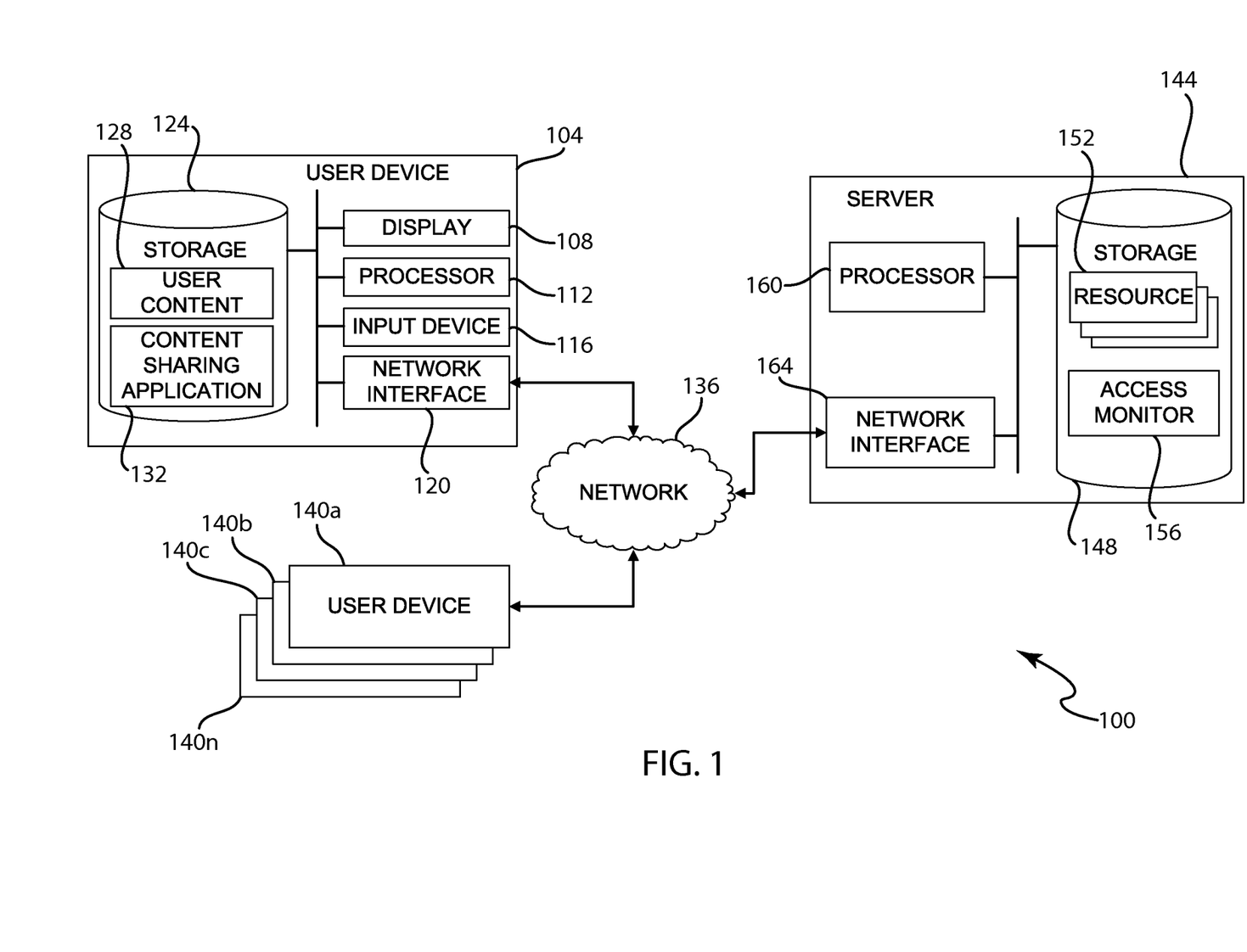
FIG. 1 is a schematic illustration of a general operating environment showing components and features of the present disclosure.

FIG. 1 is a schematic illustration of a general operating environment showing components and features of the present disclosure. FIG. 1 includes a content-sharing application 132 that is configured to execute on a user device 104 and that is operable to share content from the user device 104 to one or more other user devices 140*a-n*. The content-sharing application 132 may be provided in association with one or more servers 144 or other computing devices or components that facilitate sharing of content between the user device 104 and the plurality of other user devices 140*a-n*. Thus, in certain embodiments, the content-sharing application 132 stores content on the server 144 or other computing device such that the content may be provided as a resource 142 responsive to requests for the content. The content-sharing application then shares the content by transmitting a shareable link associated with the resource 142 to one or more other user devices 140*a-n*. In accordance with certain embodiments, the server 144 or other computing device includes or is otherwise provided in association with an access monitor 156 that provides conditional access to the resource 142 depending on whether or not certain access limitations have been exceeded. In certain embodiments, the access monitor 156 may be configured to execute on the user device 104 rather than a server 144.

The user device 104 that executes the content-sharing application 132 generally may be any electronic device that is operable to run processor-executable code and to communicate data across a network 136. In certain embodiments, the user device 104 may be implemented as a smart phone, mobile phone, cellular phone or other similar device that is configured to communicate across a telecommunications network. In other embodiments, the user device 136 may be implemented as a laptop computer, desktop computer, or similar device that is configured to communicate across a computer network, such the Internet. Certain implementations of the user device 136, such as a smart phone or tablet computer, may be configured to communicate data across both a telecom and a computing network. Thus, the network 136 may include various telecom or computing network components, as appropriate depending on the implementation.

Generally, the user device 104 includes a processor 112 component that is configured to run processor-executable code to perform various operations and functions associated with the user device 104. As described in greater detail below, the content-sharing application 132 may execute on the processor 112 to share content from the user device 104 to one or more other user devices 140*a-n*. Processor-executable code run by the processor 112, such as code associated with the content-sharing application 156, may be stored locally, either temporarily or on a long-term basis, in an on-board memory device, referred to generally as storage 124. The processor 112 may also run processor-executable code that is received through a network interface 120 from across the network 136. The network interface 120 may contain appropriate hardware components for interconnecting the user device 104 to the network 136 and these components may vary depending on the type of user device and network used in a particular implementation. For example, in the event that that user device 104 is a wireless device such as mobile phone, the network interface 120 may include a baseband processor, a wireless antenna, and so on. The network interface 120 may be configured to support any wireless interface protocol or any wireless mechanism that transmits data using radio waves such as, for example, IEEE 802.11, Bluetooth, beaconing, proximity sensors, radiofrequency identification (RFID), and so on. Alternatively or in combination, the network interface 120 may include hardware that implements an Ethernet, Universal Serial Bus (USB) or other wired connection. The user device 104 may be configured to receive user input through an input device 116 such as a keyboard, keypad, touch screen, touchpad, or the like. Visual output may be provided to the user through the operation of a user display 108, such as a monitor or an integrated display screen. As can be appreciated by one of skill in the art, a user device 104 used in accordance with various embodiments may additionally include certain components not specifically illustrated in FIG. 1, such as for example, an integrated camera, speakers, a microphone, et cetera.

The storage 124 component of the user device 104 may include both volatile and non-volatile components. The non-volatile component of the storage 124 typically does not require power to preserve data and thus may be used to store copies of files, programs, or other data when the user device 124 is powered down. The volatile component of the storage 124 typically requires power to preserve data, but can provide faster access in comparison to the non-volatile component. Thus, the volatile memory component typically stores files, programs, or other data that are currently or have been recently in use by the processor 112. Accordingly, the user device 104 may operate by moving files, programs, or other data between the volatile and non-volatile memory components as needed by the current operations being executed by the processor 112. The storage 124 component may also operate in combination with a "cloud storage" system that backs-up and/or stores data, applications, or other data on one or more remote devices. Such a cloud storage system may enable device independence by allowing a user to access her applications or data on more than one user device 104. By way of example, FIG. 1 shows a content-sharing application 132 in accordance with present embodiments as being stored locally in storage 124. However, it should be appreciated that all or a portion of the code and/or data associated with the content-sharing application 132 could be stored in a storage device that is remote from the user device 104. The storage 124 also may include certain components not shown in FIG. 1, such as for example other applications and an operating system.

The content-sharing application 132 is operable to share content 128 such as pictures, videos, documents, drawings, illustrations, audio files, and so on. The content 128 may be generated through an operation of the user device 104, such as taking a photograph with an on-board camera, recording a voice memo with an on-board microphone, or generating a document with an application running on the user device 104. Alternatively, the content 128 may be received at the user device 104 from an external source, such as being transferred from another device, or being downloaded from the Internet. By way example, FIG. 1 shows user content 128 as being stored locally in the on-board storage device 128. However, it should be appreciated that all or a portion of the user content 128 could be stored in a storage device that is remote from the user device 104, such through the operation of a cloud storage system.

In accordance with certain embodiments, the content-sharing application 132 may communicates with a server 144 or other computing device in order to facilitate sharing of content between the user device 104 and the plurality user devices 140*a-n*. More specifically, the content-sharing application 132 may upload user content 128 to the server 144, which then stores or otherwise associates the user content with a resource 152 that is operable to provide the content responsive to requests. As used herein, a "resource" refers to a computing device component or element that is configured to provide content or data responsive to read requests sent across a network 136, such as the Internet. Generally, a user may perform a read request through the operation of a web-browser or other appropriate networking application. The web-browser or other application initiates and handles a network transaction that addresses the resource 152 by a Uniform Resource Indicator (URI) or other appropriate mechanism. The server 144 completes the network transaction by transferring content associated with the resource 152 across the network 136 to the device that initiated the read request.

Generally, the server 144 or other computing device includes a processor 160 component that is configured to run processor-executable code to perform various operations and functions associated with the server 144. As described in greater detail below, an access monitor 156 may execute on the processor 160 to monitor requests for access to the resource 152 that are received at the server 144. Processor-executable code run by the processor 160, such as code associated with the access monitor 156, may be stored locally, either temporarily or on a long-term basis, in an on-board memory device, referred to generally as storage 144. The processor 160 may also run processor-executable code that is received through a network interface 164 from across the network 136. The network interface 164 may contain appropriate hardware components for interconnecting server 144 to the network 136 and may vary depending on the type of server and network used in a particular implementation. FIG. 1 shows an individual server 144 by way of example and not limitation. However, it should be appreciated that certain embodiments may employ multiple servers. Thus, it may be the case that the resource 152 and/or code associated with the access monitor 156 is stored on an individual server, or it may be the case that storage of the resource 152 and/or code associated with the access monitor 156 is distributed across multiple servers.

Once user content 128 has been uploaded and stored on the server 144 as a resource 152, the server 144 may make available a sharable link to the resource 152. In one embodiment, the sharable link may take the form a URI that the server 144 transfers across the network 136 to the originator of the content 128 once the content 128 has been uploaded. Here, the server 144 may transfer a character string to the user device 104 that contains a URI formatted in an appropriate computer networking language, such as in Hyper-Text Mark-up Language (HTML). The originator of the content 128 may then share the content 128 by transferring the sharable link across the network 136 to one or more other user devices 140*a-n*. For example, in the event that the sharable link takes the form of a character string, the originator of the content 128 may share the content by cutting and pasting the character string into an email or text message that is then sent to one or more other user devices 140*a-n*. In certain embodiments, the URI may be more transparent to the various users. For example, the server 144 may embed the URI in a picture, icon, text string, or the like. The originator of the content 128 may then transfer the picture, icon, or string, and in so doing transfer the embedded URI. In other embodiments, the originator of the content 128 may upload and/or share the content 128 through a social networking platform. Here, the originator of the content 128 logs into the social-networking platform using her name or other credentials and uploads and/or shares the content using various buttons or icons that the social networking platform provides for that purpose.

Once the server 144 or other computing device makes the sharable link available, it may be the case that, over time, the sharable link is transferred among greater and greater numbers of users. For example, once the originator of the content 128 receives the sharable link from the server 144, the originator may share the content 128 with one or more friends by transferring the shareable link to the friend's device, referred to herein as a first user device 140*a*. The friend may then share the link with another friend by transferring the sharable link to another friend's device, referred to herein as a second user device 140*b*. This process may continue and, over time, the sharable link comes to be transferred to greater and greater numbers of user devices 140*a-n*. In other words, the shareable link "goes viral."

In accordance with certain embodiments, an access monitor 156 monitors and controls read requests that are made to the resource 153. In one respect, the access monitor's 156 actions may enforce user preferences as to the amount and kind of access that is granted to the resource. In another respect, the access monitor's 156 actions may protect the server 144 in the event that the shareable link "goes viral." More specifically, as the shareable link comes to be transferred to greater and greater numbers of user devices 140*a-n*, the access monitor's 156 actions protect the server 144 from becoming overburdened with requests for access to the resource 152. Thus, the access monitor 144 may receive or otherwise monitor the incoming requests for access to the resource 152 and may grant or deny requests based on certain predetermined access limits that have been placed on the resource 152. In one embodiment, numerical access limits may be placed on the resource 152 such that only a certain number of users may have access the resource 152. In another embodiment, geographic limits may be placed on the resource 152 such that only users located within a certain geographic boundary are permitted to access the resource 152. In certain cases, the access limits placed on the resource 152 may be modified in response to user input or in response to analysis of server traffic loads.

Figure 2:
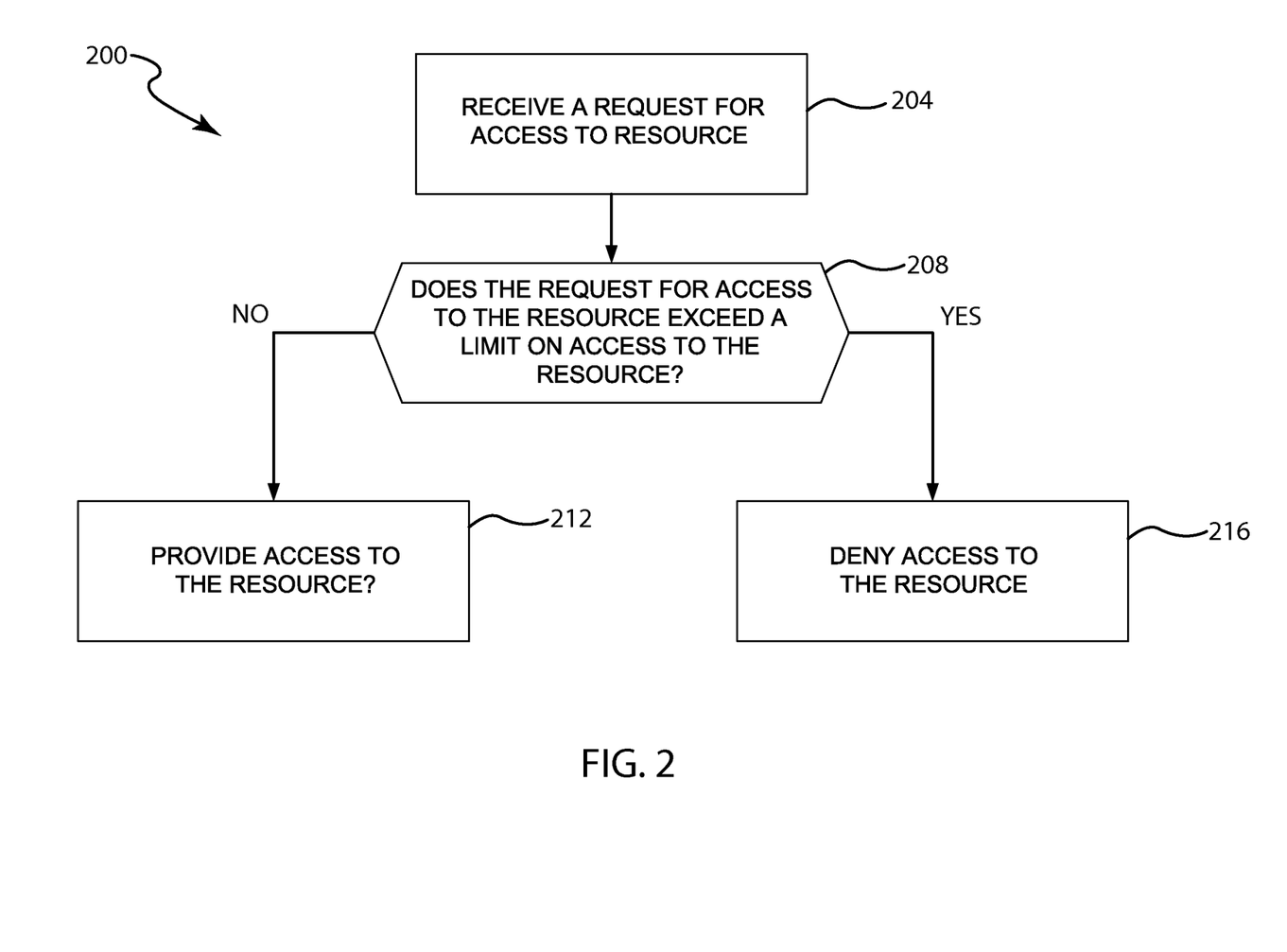
FIG. 2 is a flow chart that illustrates an example operation of the access monitor show in FIG. 1 in accordance with embodiments discussed herein.

FIG. 2 is a flow chart 200 that illustrates example operations of an access monitor 156 in accordance with embodiments discussed herein. The operations of flow chart 200 generally provide for the access monitor's 156 permitting or denying request for access to a resource 152 based on access limits placed on the resource 152. Initially, in operation 204, the access monitor 156 receives or otherwise monitors a request for access to a resource 152 that is stored on or otherwise associated with a server 144 or other computing device. Continuing with the example above, the access monitor 156 receives and monitors an access request from, for example, the second user devices 140*b*, which sends the request across a network 136. Thus, having received the sharable link from the first friend, the second friend uses the URI associated with the shareable link to attempt a read of the resource 152. Once the read request is received by the access monitor 156, control may pass to operation 208.

Figure 3:
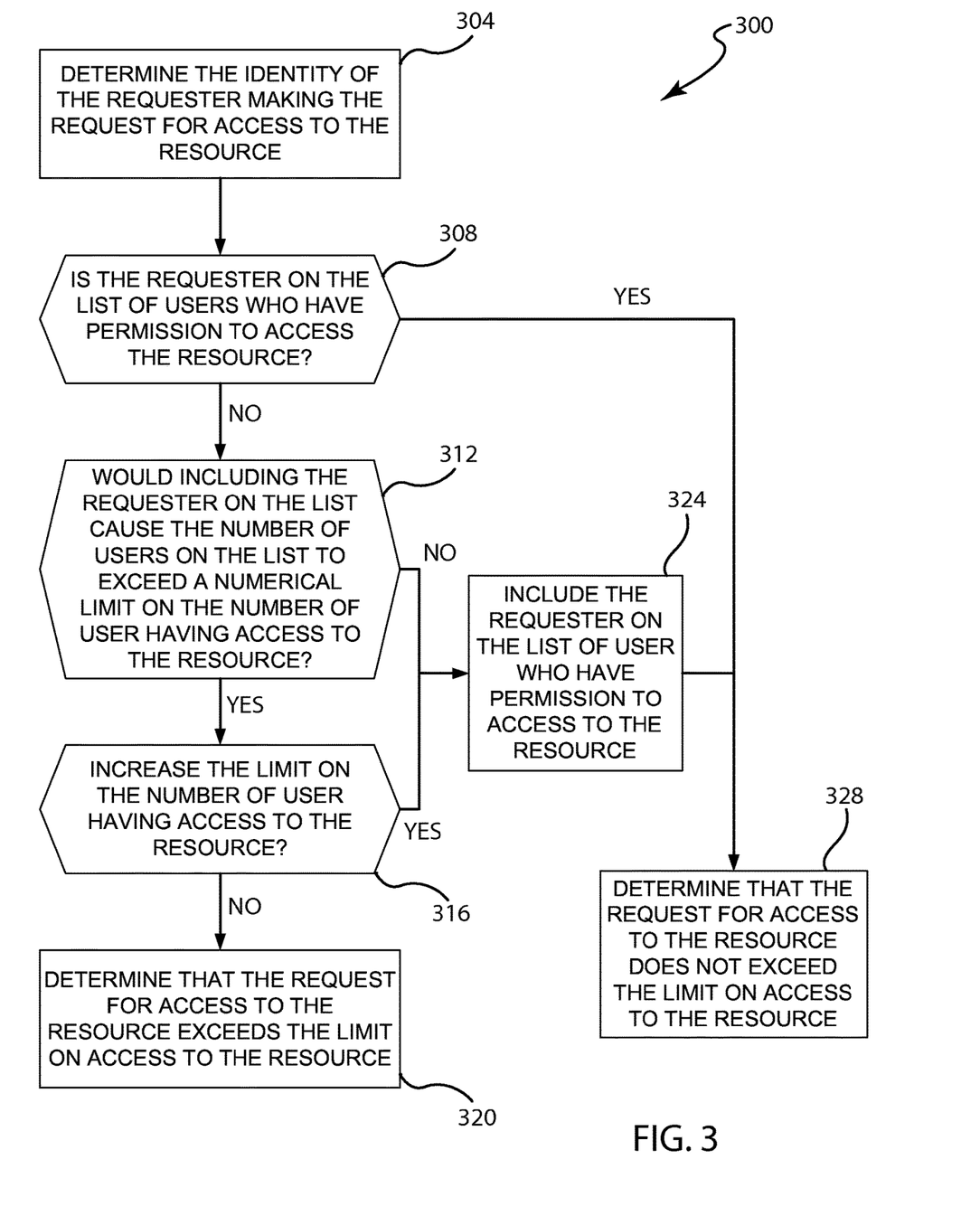
FIG. 3 is a flow chart that illustrates further example operations of the access monitor of FIG. 1 that carry out an operation of determining whether or not a read request exceeds a numerical limit on access to a read source.
Figure 4:
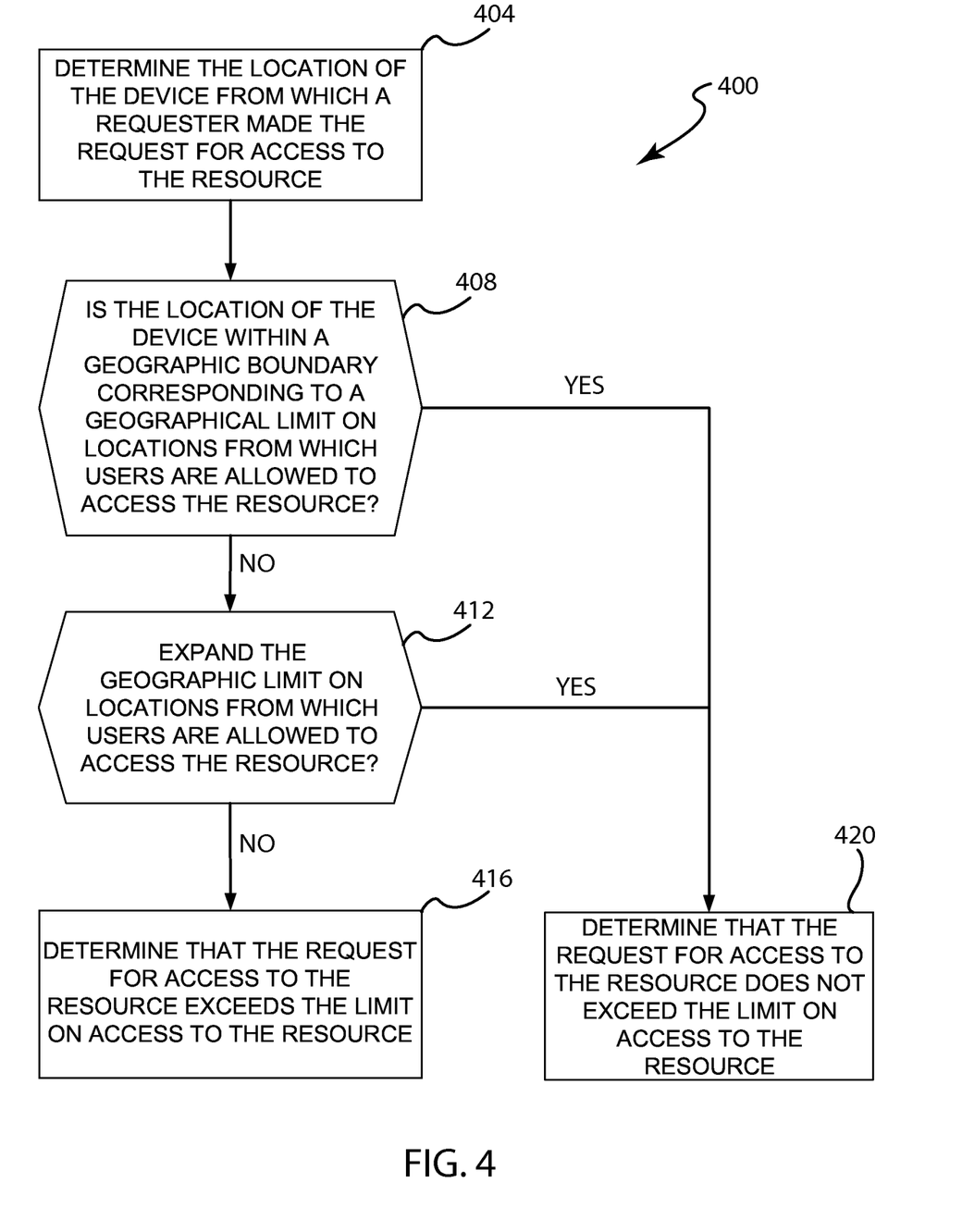
FIG. 4 is a flow chart that illustrates further example operations of the access monitor of FIG. 1 that carry out an operation of determining whether or not a read request exceeds a geographic limit on access to the read source.

In operation 208, the access monitor 156 determines if the read request received in operation 204 exceeds a limit placed on access to the resource 152. The type analysis performed by the access monitor 156 in operation 208 will depend on the type of access limit that is placed on the resource 152. Various access monitor 156 embodiments for different types of access limits are described in greater detail in connection with later figures. FIG. 3 illustrates an access monitor 156 embodiment where a numerical limit is placed on the resource 152 such that a maximum number of users may be allowed to access the resource 152. FIG. 4 illustrates an access monitor 156 embodiment where a geographical limit is placed on the resource 152 such that only those users that access the resource from within a certain defined geographical boundary are granted access.

Regardless of the type of access limit that is placed on the resource 152, once the access monitor analyzes the request in operation 208 control passes to either operation 212 or operation 216 depending on the result. If the access monitor 156 determines, in operation 208, that the read request does not exceed the limit on access to the resource 152, then operation 212 is executed following operation 208. In operation 212, the second user device 104*b* is allowed to access the content 128 that is associated with the resource 152. If the access monitor 156 determines that the read request does exceed the limit on access to the resource 156, then operation 216 is executed following operation 208. In operation 216, the second user device 104*b* is not allowed to access the content 128 that is associated with the resource 152.

Turning now to operations of the access monitor 156 that analyze read requests in view of particular types of access limits, reference is first made to FIG. 3. FIG. 3 is a flow chart 300 that illustrates further example operations of the access monitor 156 that carry out an operation of determining whether or not a read request received exceeds a numerical limit on access to the resource 152. The operations of flow chart 300 may be considered a more detailed embodiment of operation 208, discussed above in connection with FIG. 2. Continuing with the example above, the access monitor 156 analyzes an access request from, for example, the second user device 140*b*. Initially, in operation 304, the access monitor 156 determines the identity of the requester that is making the request for access to the resource 152. In certain embodiments, the access monitor 156 may determine an identity of the requester by certain identifying information that is associated with the second user device 140*b*. For example, the second user device 140*b* may be identified by a Media Access Control (MAC) address associated with the device 140*b* or an Internet Protocol (IP) address associated from that second user device 140*b* typically uses in making requests to the server 144. In other embodiments, the access monitor 156 may determine an identity of the request by name if the request is made through a social media platform that requires identifying information on log-in. Once the identity of the requester is obtained in operation 304, control may pass to operation 308.

In operation 308, the access monitor 156 determines if the requester is on a list of users who have permission to access the resource 152. The list of users who have permission to access the resource 152 may be maintained on the server 144 and may include identifying information for users who have been granted access to the resource 152 prior to the current request that is being analyzed. In one embodiment, the list may be initially empty and then populated as requests are received by various user devices 140a-n. In another embodiment, the list may be initially populated by an originator of the content 128 associated with the resource 152. If the list is initially populated, it may be the case that a particular user will drop off the list if that user has not accessed the resource 152 within a predetermined time. Thus, in operation 308, the access monitor 156 may compare the identity of the requester obtained in operation 304 to identifying information of the users contained in the list. If the access monitor 156 determines that the requester is on the list of users having access to the resource 152, operation 328 may be executed following operation 308. In operation 328, the access monitor 156 determines that the request for access to the resource 152 does not exceed the limit on access to the resource 152. If the access monitor 156 determines that the requester is not on the list of users having access to the resource 152, operation 312 may be executed following operation 312.

In operation 312, the requester is not on the list of users who have previously been granted access to the resource 152. Thus, operation 312 may include determining if including the requester on the list of users having access would cause the number of users on the list to exceed a numerical limit on users that have access the resource 152. If the access monitor 156 determines that placing the requester on the list would not cause the limit to be exceeded, then operation 324 may be executed following operation 312. In operation 324, the access monitor 156 includes the requester on the list of users that have access to the resource 152. Operation 328 may be executed following operation 324. As described above, in operation 328, the access monitor 156 determines that the request for access to the resource 152 does not exceed the limit on access to the resource 152.

Figure 6A:
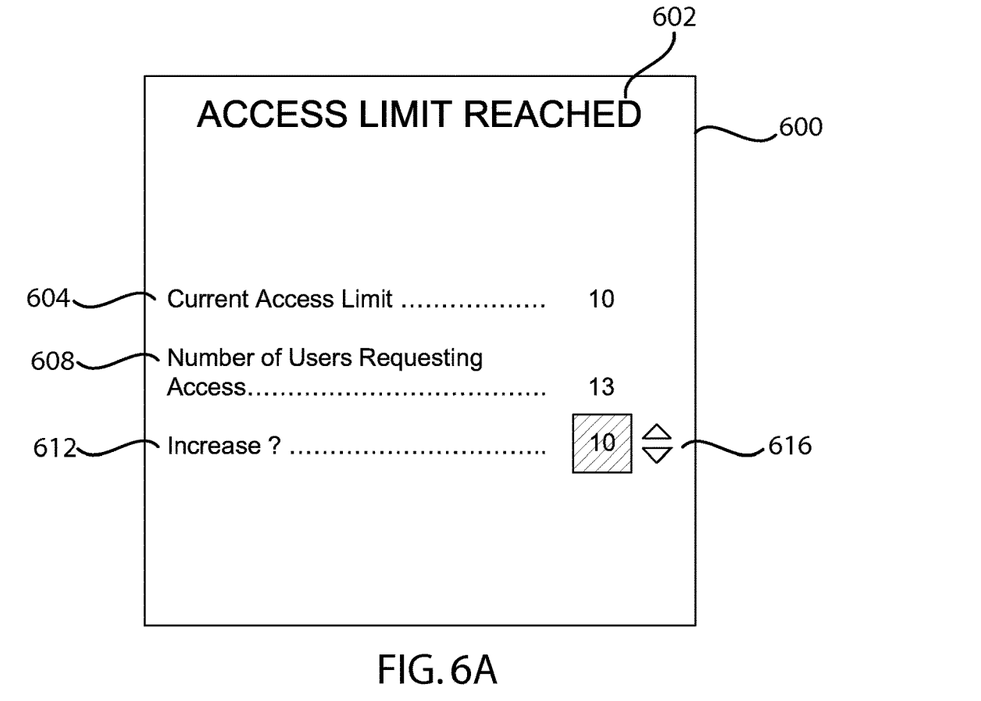
FIG. 6A is a screen-shot of an example graphical user interface that enables a user to modify a numerical access limit for the read source shown in FIG. 1.
Figure 6B:
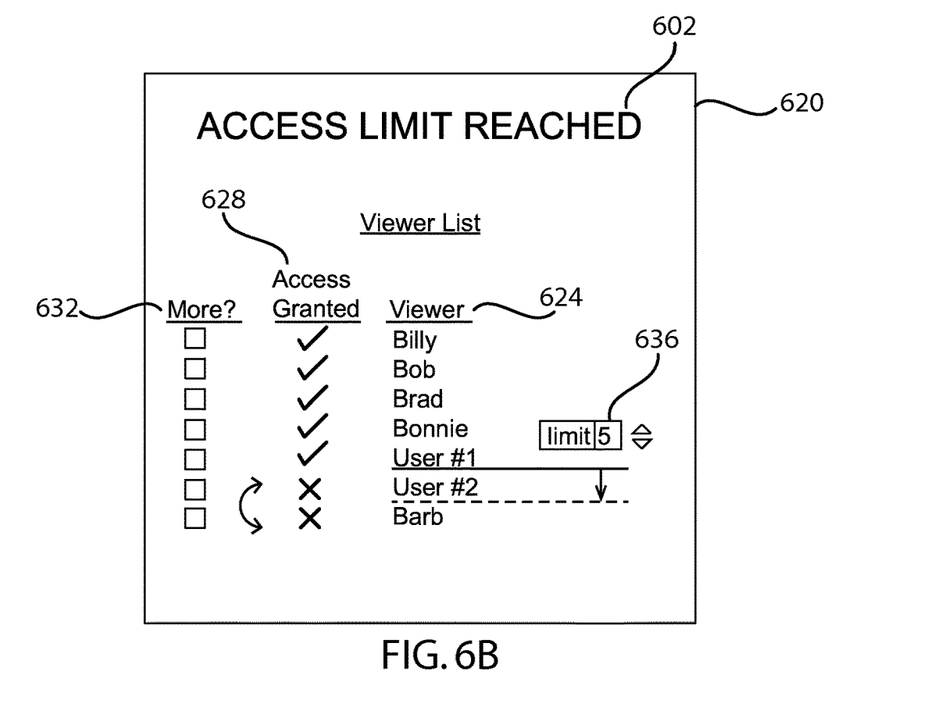
FIG. 6B is a screen-shot of another example graphical user interface that enables a user to modify a numerical access limit for the read source of FIG. 1.

If, in operation 312, the access monitor 156 determines that placing the requester on the list of users that have access the resource 152 would cause the limit to be exceed, then operation 316 may be executed following operation 312. In operation 316, the access monitor 156 may optionally determine if the limit on the number of user having access to the resource 152 should be increased. In one embodiment, the access monitor 152 may check to see if it has the most recent access limitation settings in the event that the owner or originator of the content has recently changed the settings. In another embodiment, the access monitor 156 sends the owner or originator of the content 128 associated with the resource 152 a notice that the numerical limit has been reached. The notice may include a mechanism by which the originator of the content 128 may increase the current numerical access limit that is placed on the resource 152. Example mechanisms by which the originator of the content 128 may increase the current numerical access limit, whether in response to a notice or in connection with user's own monitoring of the content, are illustrated in FIGS. 6A-6B and are described in greater detail below. In another embodiment, the access monitor 156 analyzes the current and anticipated future traffic levels on the server 144 to determine if increasing the numerical access limit would adversely impact the operation of the server 144.

If, in operation 316, the access monitor 156 determines that numerical limit should be increased, then operation 324 may be executed following operation 316. As described above, in operation 324, the access monitor 156 includes the requester on the list of users that have access to the resource 152. Following this, the access monitor 156 determines that the request for access to the resource 152 does not exceed the limit on access to the resource 152 in operation 328. If, in operation 316, the access monitor 156 determines that numerical limit should not be increased, then operation 320 may be executed following operation 316. In operation 320, the access monitor 156 determines that the request for access to the resource 152 does exceed the numerical access limit that is placed on the resource 152.

Continuing with the discussion of operations of the access monitor 156 that analyze read requests in view of particular types of access limits, reference is now made to FIG. 4. FIG. 4 is a flow chart 400 that illustrates further example operations of the access monitor 156 that carry out an operation of determining whether or not a read request exceeds a geographical limit on access to the resource 152. The operations of flow chart 400 may be considered a more detailed embodiment of operation 208, discussed above in connection with FIG. 2. Continuing with the example above, the access monitor 156 analyzes an access request from, for example, the second user device 140b. Initially, in operation 404, the access monitor 156 determines the geographic location of the requester that is making the request for access to the resource 152. In certain embodiments, the access monitor 156 determines the geographic location of the requester by determining the request's IP address and referencing the IP address against a database of geographic locations assigned to certain IP addresses. In other embodiments, the access monitor 156 determines the geographic location of the requester by analyzing Global Positioning Systems (GPS) tags or other location services information that is associated with the access request. Once the geographic location of the requester is obtained in operation 404, control may pass to operation 408.

In operation 408, the access monitor 156 determines whether not the second user device 140b making the request is within a geographical boundary corresponding to a geographical limit on locations from which users are allowed to access the resource 152. In one embodiment, the geographical limit may be centered on the location of the user device 104 when the content 128 was originally transferred to the server 144 to be stored as a resource 152. In other embodiments, the geographic limit may be centered on a user-specified geographic location. In still other embodiments, the geographic limit may correspond to political boundaries such as state lines or city limits. Thus, in operation 408, the access monitor 156 compares the geographic location obtained in operation 404 to information that specifies the geographic access limit. If the access monitor 156 determines that the requester is inside of the geographic boundary, operation 420 may be executed following operation 408. In operation 420, the access monitor 156 determines that the request for access to the resource 152 does not exceed the geographical limit on access to the resource 152. If, in operation 408, the access monitor 156 determines that the request is outside of the geographic boundary, operation 412 may be executed following operation 408.

Figure 7A:
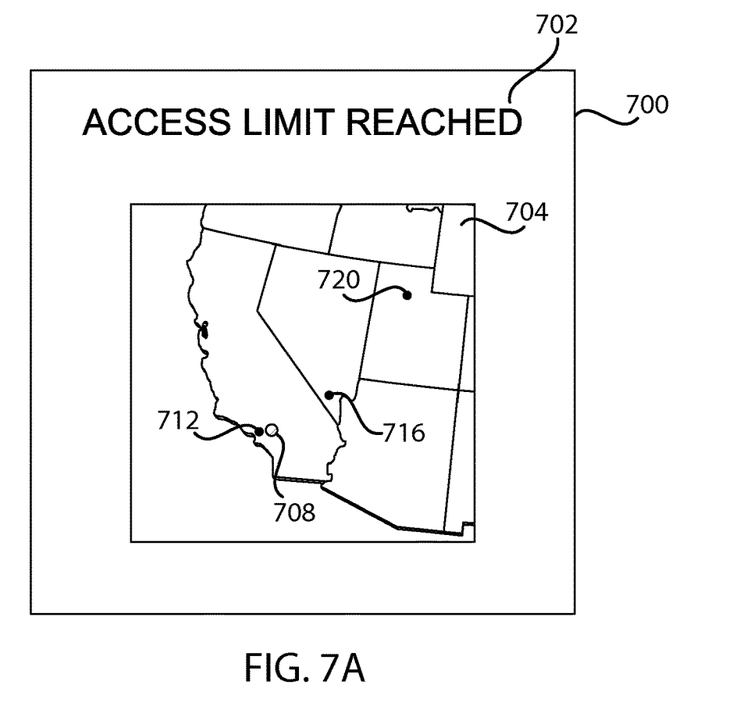
FIG. 7A is a screen-shot of an example graphical user interface that presents a user with a graphical representation of geographical access limits for the read source of FIG. 1 that have been exceed.
Figure 7B:
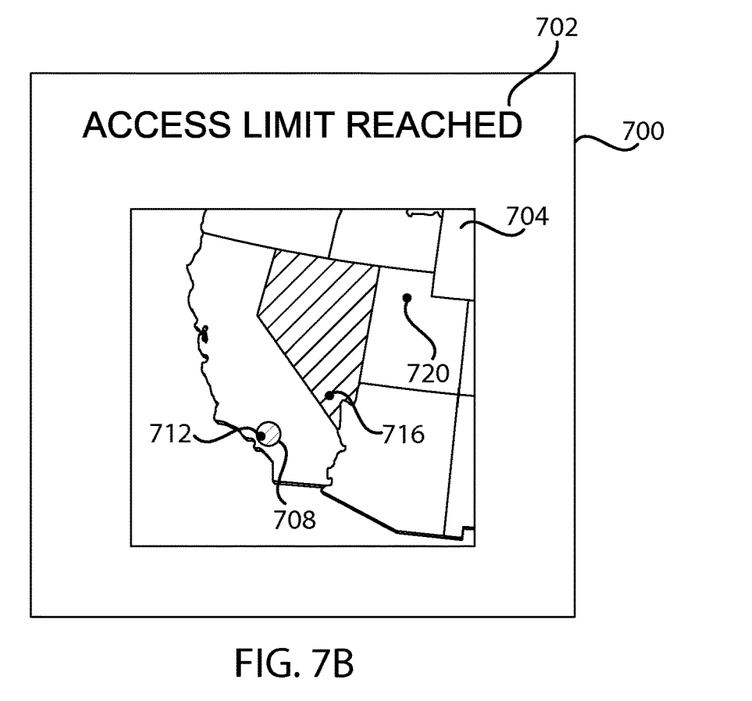
FIG. 7B is a screen-shot of the example graphical user interface of FIG. 7B after a user has modified the geographical access limits for the read source of FIG. 1.

In operation 412, the requester is outside of the geographic area from which users are allowed access to the resource 152. Thus, operation 412 may optionally include determining if the geographic limit on access to resource should be expanded. In one embodiment, the access monitor 152 may check to see if it has the most recent access limitation settings in the event that the owner or originator of the content has recently changed the settings. In another embodiment, the access monitor 156 sends the originator of the content 128 associated with the resource 152 a notice that the geographic limit has been reached. The notice may include a mechanism by which the originator of the content 128 may increase the current geographic access limit that is placed on the resource 152. An example mechanism by which the originator of the content 128 may increase the current geographical access limit, whether in response to a notice or in connection with user's own monitoring of the content, is illustrated in FIGS. 7A-7B and is described in greater detail below. In another embodiment, the access monitor 156 analyzes the current and anticipated future traffic levels on the server 144 to determine if increasing the numerical access limit would adversely impact the operation of the server 144.

If, in operation 412, the access monitor 156 determines that the geographic limit on access to resource 132 should be expanded, then operation 420 may be executed following operation 412. As described above, in operation 420, the access monitor 156 determines that the request for access to the resource 152 does not exceed the geographical limit on access to the resource 152. If the access monitor 156 determines that the geographic limit on access to resource should not be expanded, then operation 416 may be executed following operation 412. In operation 416, the access monitor 156 determines that the request for access to the resource 152 exceeds the geographic limit on access to the resource 152.

Figure 5:
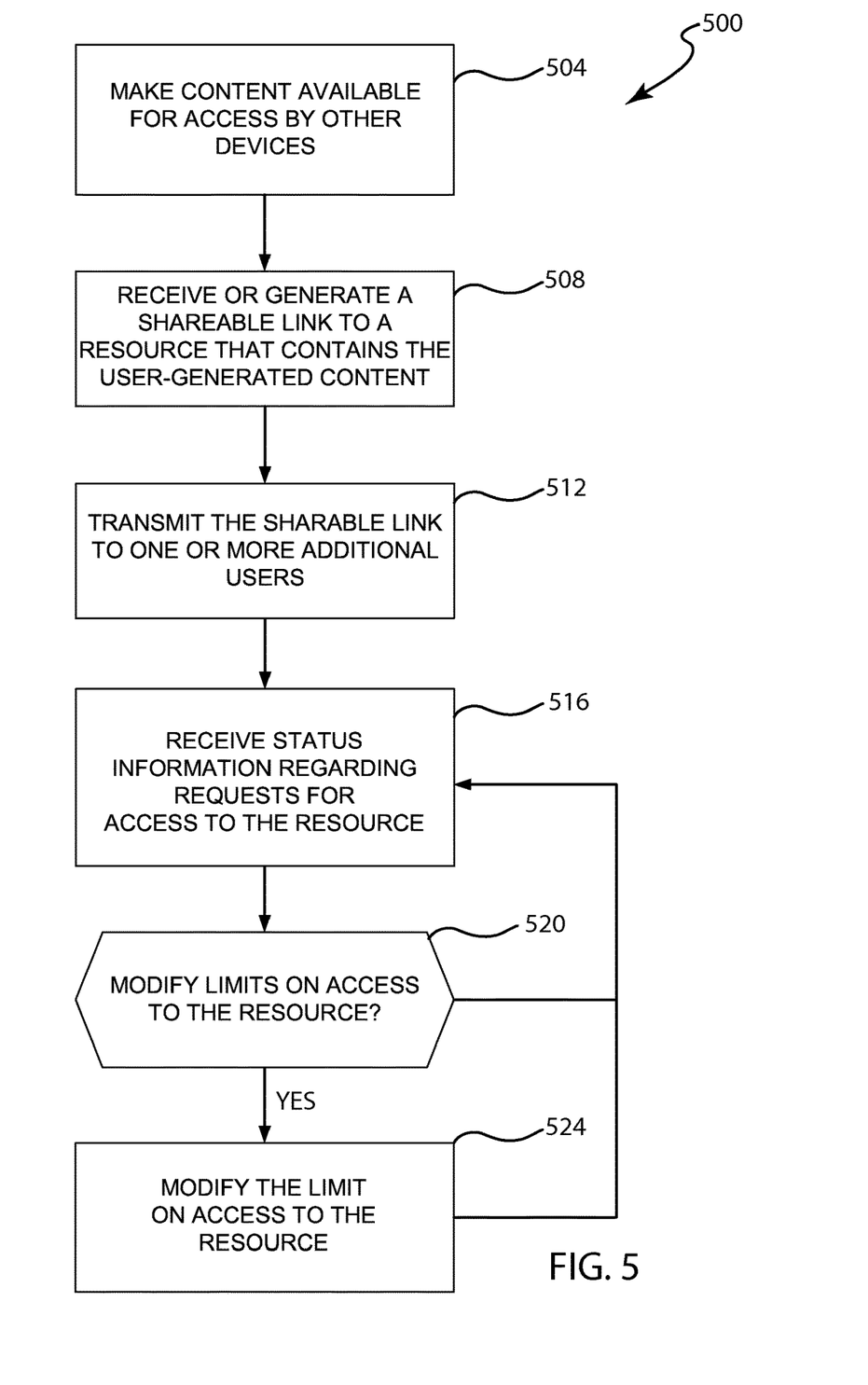
FIG. 5 is a flow chart that illustrates an example operation of the content-sharing application of FIG. 1 in accordance with embodiments discussed herein.

Turning now to operations of the content-sharing application 132, reference is made to FIG. 5. FIG. 5 is a flow chart 500 that illustrates an example operation of a content-sharing application 132 in accordance with embodiments discussed herein. The content-sharing application 132 is generally configured to execute on a user device 104 to set and adjust access limitations on shared content. Initially, in operation 504, the content-sharing application 132 makes available content 128 for access by other devices 140a-n. In one embodiment, the content-sharing application makes the content available by transmitting the content from the user device 104 to a server 144 or other computing device provided for the purpose of facilitating content sharing. For example, the content-sharing application 132 may transfer or otherwise make available drawings, photographs, text, audio recordings, and the like. The content 128 may be generated through an operation of the user device 104, such as taking a photograph with an on-board camera, recording a voice memo with an on-board microphone, or generating a document with an application running on the user device 104. Alternatively, the content 128 may be received at the user device 104 from an external source, such as being transferred from another device, or being downloaded from the Internet. Once the content-sharing application 132 transfers or otherwise makes available the content in operation 504, control may pass to operation 508.

In operation 508, the content-sharing application 132 receives or generates a sharable link to a resource 152 that is configured to provide the content responsive to a request. The sharable link may take the form a URI that may be used to access the resource 152. In embodiments where the resource is a component of a server 144, the server 144 may transfer the shareable across the network 136 in response to the content being up-loaded. The sharable link may be formatted in HTML or other appropriate networking language. In certain embodiments, the sharable link may take the form of a URI embedded in a picture, icon, text string, or the like. In other embodiments, the shareable link may be a component of a social networking platform utilized by the user. Once the content-sharing application 132 receives or generates a sharable link in operation 508, control may pass to operation 512.

In operation 512, the content-sharing application 132 transmits the sharable link to one or more additional user devices 140a-n. For example, the content-sharing application 132 may transmit the sharable link by cutting and pasting a character a string having a URI associated with the sharable link into an email or text message that is then sent to one or more other user devices 140a-n. In other embodiments, the content-sharing application 132 transfers a picture, icon, or string, and in so doing transfers a URI that is embedded therein. In still other embodiments, the content-sharing application 132 transfers the shareable link through a social networking platform. Once the content-sharing application 132 transmits the sharable link in operation 512, control may pass to operation 516.

In operation 516, the content-sharing application 132 receives input as to the status of current and/or past read requests received for the content. In certain respect, the content-sharing application 132 may receive status information so as to enable a user to change access limitations based on the user's own priorities. In certain embodiments, the status information may include a message from the access monitor 156 indicating that requests for access to the resource 152 have exceeded a limit on access to the resource 152. In one embodiment, the message indicates that numerical access limits on the resource 152 have been reached. In other embodiments, the message indicates that geographic access limits on the resource 152 have been reached. Once the content-sharing application 132 receives the status information from the access monitor 156 in operation 516, control may pass to operation 520.

In operation 520, the content-sharing application 132 may modify the access limitations that are placed on the resource 152. In the course of making modifications to the access limitations, the content-sharing application 132 may present information to a user of the device 104 that enables the user to make decisions regarding the access limits. The user may modify the access limitations based on his or her own initiative or based on messages sent by the access monitor 156 indicating that access limitations have been reached. In one embodiment, the content-sharing application 132 presents information to the user through the operation of a graphical user interface (GUI) displayed on a display 108 associated with the user device 104. Example GUI screens that enable a user to modify access limits are shown in FIG. 6a-7b and are described in greater detail below.

Once the user has completed the process of modifying access limits on the resource 152, for example through the operation of a GUI, the content-sharing application 132 may transmit the user's changes to the access monitor 156. Thus, following operation 520, operation 524 may be executed where the content-sharing application 132 informs the access monitor 156 of updates to the access limits on the content. In certain embodiments, informing the access monitor of updates includes transmitting the modification in a message sent from the user device 104 across the network 136 to a server 144. Following operation 524, operation 516 may again be executed. More specifically, the content-sharing 132 may again receive status information as to the current and/or past read requests received for the content, which may include a message from the access monitor 156 indicating that the access limits on the resource 152 have again been reached. It also may be the case that, in operation 520, the user decides not to modify the access limits that are placed on the resource 152 in any way. In this case, operation 516 may follow directly from operation 520.

Turning now to example mechanisms by which the originator of the content 128 may increase the numerical access limits that are placed on the resource 152, reference is made to FIGS. 6A-6B. FIG. 6A is a screen-shot of an example graphical user interface (GUI) 600 that alerts a user through a heading 602 that states "ACCESS LIMIT REACHED." It should be appreciated that a user may access GUI 600 to modify access limits without those limits having specifically having been reached. In this case, the alert heading 602 would not be displayed. The example GUI 600 also includes element 604 that indicates the current numerical access limit, and an element 608 that indicates the current number of users that are or have requested access to the resource 152. Further, the example GUI 600 includes element that 612 that prompts the user to increase or perhaps decrease the current numerical access limit. By moving the numerical access limit up or down through the operation of element 612, the user may transmit changes to the access limit to the server 144.

FIG. 6B is a screen-shot of another example graphical user interface that enables a user to modify a numerical access limit for a resource 152. Like the GUI 600 shown in FIG. 6A, the GUI 620 shown in FIG. 6B may also optionally alert the user through a heading that states "ACCESS LIMIT REACHED." The example GUI 620 may additionally list one or more users by name in a viewer list 624. In so doing, the example GUI 620 may better enable the user to make decisions as to whether or not the numerical access limits should be increased. It may be the case that certain users requesting access to the resource 152 cannot be identified by name. Thus, the viewer list 624 may list these users with generic names such as "User #1" and "User #2." As shown in FIG. 6B, the viewer list 624 may be provided in association with a column 628 that indicates by way symbols such as check-marks or X's whether or not each listed viewer has previously been granted access to the resource. The user may raise or lower the numerical access limits by, for example, raising or lowering element 636, which forms a boundary between those viewers that have been granted access and those who have not. Alternatively or in combination, the user may select certain viewers through the operation of element 632 in order to move that viewer's location on the list of viewers 624.

Turning now to an example mechanism by which the originator of the content 128 may increase the geographical access limits, reference is made to FIGS. 7A-7B. FIG. 7A is a screen-shot of an example graphical user interface 700 that presents a user with a graphical representation of geographical access limits for a resource 152 that have been exceed. By way of example and not limitation, FIG. 7A shows a map 704 of the western United States that shows a current geographical access limit that includes a first geographical boundary 708 that substantially corresponds to a circular area centered at or near San Bernardino, California. The map 704 additionally shows the locations of a first 712, second 716, and third 720 out-of-bounds access requests. By way of example, the first out-of-bounds access request 712 originated from Los Angeles, California; the second out-of-bounds access request 716 originated from Las Vegas, Nevada; and the third out-of-bounds access request 720 originated from Salt Lake City, Utah.

FIG. 7B is a screen-shot of the example graphical user interface 700 of FIG. 7B after a user has modified the geographical access limits for the resource 152. As shown in FIG. 7B, the user has expanded the geographical access limits to include some, but not all of the out-of-bounds access requests 712, 716, and 720. By way of example, the user has modified the geographical access limits for the resource 152 by expanding the radius of the first geographical boundary 708 such that the first geographical boundary 708 now encompasses both San Bernardino and parts of Los Angeles. This increase causes the first request 712 to now be included within the geographic access limitations. As shown in FIG. 7B, the user has also modified the geographic access limitations to include the entire state of Nevada. This increase causes the second request 716 to now be included within the geographic access limitations. As also shown in FIG. 7B, the user has not modified the geographic access limitations to include the third request 720. Thus, the third request 720, which originated from Salt Lake City, remains outside of the geographic limitations that are placed on the resource 152. It should be appreciated that a user may access GUI 700 to modify geographic access limits without those limits having specifically having been reached. In this case, the alert heading 702 would not be displayed and the GUI 700 would display the current geographic limits without specifically showing any out-of-bounds access requests.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of protecting a server from traffic overload due to content-sharing of user-generated content comprising:

receiving user-generated content from a content-providing mobile user device executing a content-sharing application;

storing a resource containing the user-generated content on a memory component on the server, wherein the memory component is separate from the content-providing mobile user device;

receiving a plurality of requests to access the user-generated content stored on the server, wherein the plurality of requests originate from one or more content-consuming devices;

analyzing a traffic load to the server, wherein the traffic load includes the plurality of requests;

identifying geographical locations of the plurality of requests based on respective network addresses associated with the respective requests;

setting an access limit on the user-generated content based on the traffic load, available resources of the server, and user instructions received from the content-providing mobile user device, wherein:

the user instructions specify a numerical limit on a number of users allowed to access the user-generated content and a geographical limit on locations from which users are allowed to access the user-generated content, the access limit is received from the content-providing mobile user device, and the access limit is modifiable in response to the traffic load, the geographical location of at least one of the plurality of requests, a determination whether the geographical location of the at least one of the plurality of requests is outside the locations from which the users are allowed to access the user-generated content, and a determination to expand the geographical limit;

setting an access list of one or more users having permission to access the resource, wherein one or more users are removed from the access list if the resource has not been accessed within a predetermined time;

generating a shareable link including a uniform resource identifier (URI) identifying a location of the resource on the server containing the user-generated content on the memory component;

transmitting the shareable link from the server to the one or more content-consuming devices via a network;

monitoring the access limit on the user-generated content, wherein monitoring comprises:
  receiving a request at a server from across the network from a content-consuming device to access the resource having the user-generated content via the shareable link, wherein the content-consuming device is separate from the content-providing mobile user device, and wherein the traffic load to the server includes the request, and
  analyzing the request by a monitor executing on the server to determine if the request for access exceeds the access limit;

granting access to the content-consuming device for the user-generated content responsive to determining that the access limit is not exceeded;

denying access to the content-consuming device for the user-generated content responsive to determining that the access limit is exceeded;

receiving a message by the content-sharing application indicating that requests for access to the user-generated content have exceeded the access limit; and in response to receiving the message by the content-sharing application:
  sending a request to the content-providing mobile user device,
  retrieving an updated access limit from the content-providing mobile user device, and
  executing an operation of the application to modify the access limit to the user-generated content, based on the updated access limit, the available server resources, and the traffic load.

2. The content-sharing method of claim 1, wherein the access limit is modifiable by an owner of the content using the content-providing mobile user device.

3. The method of claim 1, wherein the monitoring further comprises:
  responsive to determining that the request exceeds the access limit, determining by the monitor whether the access limit has been increased.

4. The method of claim 3, wherein
  the operation of granting access comprises granting access to the content by the monitor responsive to the request responsive to determining that the access limit is increased; and
  the operation of denying access comprises denying access to the content by the monitor responsive to the request responsive to determining that the access limit is not increased.

5. The method of claim 1, wherein the analyzing the request by the monitor comprises:
  analyzing the request to determine an identity of a requester making the request;
  comparing the identity of the requester to the access list of users who have permission to access the resource; and
  determining that the request does not exceed the access limit responsive to determining that the requester is included in the access list of users who have permission to access the resource.

6. The method of claim 5, wherein the analyzing the request by the monitor further comprises:
  responsive to determining that the requester is not included in the access list of users who have permission to access the resource, determining whether adding the requester to the access list would cause a number of users on the access list to exceed the numerical limit on the number of users that are allowed to access the content;
  adding the requester to the access list responsive to determining that doing so would not cause a number of users on the access list to exceed the numerical limit on the number of users that are allowed to access the user-generated content; and
  responsive to adding the requester to the access list of users who have permission to access the user-generated content, determining that the request does not exceed the access limit.

7. The method of claim 6, wherein the operation of analyzing the request by the monitor further comprises:
  responsive to determining that adding the requester to the access list of users who have permission to access the resource would cause the number of users on the access list to exceed the numerical limit on the number of users that are allowed to access the content, determining that the request exceeds the access limit.

8. The method of claim 1, wherein the operation of analyzing the request by the monitor comprises:
  analyzing the request to determine a location of a device from which the request was made;
  comparing the location of the device to a geographical boundary corresponding to the geographical limit on locations from which users are allowed to access the content; and
  determining that the request does not exceed the access limit on access to the content if the device is located within the geographical boundary.

9. A content-sharing method for preserving server resources, the method comprising:
  receiving user-generated content from a mobile user device executing a content-sharing application;
  storing the user-generated content on a server;
  providing access to the user-generated content over a network through a shareable link, the shareable link including a Uniform Resource Identifier (URI) pointing to a location of the user-generated content on the server;
  transmitting the shareable link from the server to the mobile user device;
  transmitting the shareable link from an application executing on the mobile user device to at least a second user device;
  receiving a plurality of requests to access resources stored on the server, wherein the plurality of requests originate from one or more content-consuming devices;
  analyzing a traffic load to the server, wherein the traffic load includes the plurality of requests;
  identifying geographical locations of the plurality of requests based on respective network addresses associated with the respective requests;

setting an access limit on the user-generated content based on the traffic load, available server resources, and user instructions received from the mobile user device, wherein the user instructions specify a numerical limit on a number of users allowed to access the user-generated content and a geographical limit on locations from which users are allowed to access the user-generated content;

setting an access list of one or more users having permission to access the resource having the user-generated content, wherein one or more users are removed from the access list if the resource has not been accessed within a predetermined time;

monitoring the access limit and traffic load to the server including a plurality of requests to access resources stored on the server, wherein the monitoring comprises:
  receiving a request of the plurality of requests at the server from across the network from one of the one or more content-consuming devices to access the resource having the user-generated content via the shareable link, wherein the one of the one or more content-consuming devices is separate from the mobile user device;
  analyzing the request by a monitor executing on the server to determine if the request for access exceeds the access limit;
  denying access to the user-generated content responsive to determining that the received request exceeds the access limit on the user-generated content;

modifying the access limit in response to the traffic load, the geographical location of at least one of the plurality of requests, wherein modifying the access limit comprises determining whether the geographical location of the at least one of the plurality of requests is outside the locations from which the users are allowed to access the user-generated content, and determining to expand the geographical limit;

receiving a message by the application indicating that requests for access to the user-generated content have exceeded the access limit to the user-generated content; and in response to receiving the message by the application:
  sending a request to the mobile user device executing the content-sharing application,
  retrieving an updated access limit from the content-providing mobile user device, and
  executing an operation of the application to modify the access limit to the user-generated content, based on the updated access limit, the available server resources, and the traffic load.

10. The content-sharing method of claim 9, wherein the operation of modifying the access limit includes raising the numerical limit.

11. A content-sharing platform, comprising:
a mobile user device comprising a first processor that executes an application that publishes user-generated content and transmits an electronically shareable link through which the user-generated content is accessible, the shareable link including a uniform resource identifier (URI) identifying the user-generated content; and a server comprising a second processor configured to:
  receive the user-generated content from the application and to store the user-generated content such that the user-generated content may be accessed via the electronically shareable link;
  receive a plurality of requests to access the user-generated content stored on the server, wherein the plurality of requests originate from one or more content-consuming devices;
  analyze a traffic load to the server, wherein the traffic load includes the plurality of requests;
  identify geographical locations of the plurality of requests based on respective network addresses associated with the respective requests;
  set an access limit on the user-generated content based on the traffic load, available server resources, and user instructions received from the mobile user device, wherein:
    the user instructions specify a numerical limit on a number of users allowed to access the user-generated content and a geographical limit on locations from which users are allowed to access the user-generated content, and
    the access limit is modifiable in response to the traffic load, the geographical location of at least one of the plurality of requests, a determination whether the geographical location of the at least one of the plurality of requests is outside the locations from which the users are allowed to access the user-generated content, and a determination to expand the geographical limit;
  set an access list of one or more users having permission to access a resource having the user-generated content, wherein one or more users are removed from the access list if the resource has not been accessed within a predetermined time;
  receive a request of the plurality of requests over a network from a content-consuming device to access the resource having the user-generated content via the shareable link, wherein the content-consuming device is separate from the mobile user device;
  analyze the request by a monitor to determine if the request exceeds the access limit; and
  deny the request for access to the user-generated content in an event where the request exceeds the access limit;
  responsive to the event that the request exceeds the access limit, send a message to the application indicating that requests for access to the user-generated content have exceeded the access limit; and
  in response to sending the message to the application:
    send a request to the content-providing mobile user device,
    retrieve an updated access limit from the content-providing mobile user device, and
    execute an operation of the application to modify the access limit to the user-generated content, based on the updated access limit, the available server resources, and the traffic load.

* * * * *